(12) United States Patent
Grabau (10) Patent No.: US 9,371,819 B2
(45) Date of Patent: Jun. 21, 2016

(54) METHOD AND SYSTEM TO ACTIVELY PITCH TO REDUCE EXTREME LOADS ON WIND TURBINE

(71) Applicant: Envision Energy (Denmark) ApS, Silkeborg (DK)

(72) Inventor: Peter Grabau, Kolding (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 568 days.

(21) Appl. No.: 13/936,628

(22) Filed: Jul. 8, 2013

(65) Prior Publication Data

US 2014/0017079 A1    Jan. 16, 2014

(30) Foreign Application Priority Data

Jul. 9, 2012   (DK) .................................. 2012 70417

(51) Int. Cl.
  *F03D 7/02* (2006.01)
  *F03D 7/04* (2006.01)

(52) U.S. Cl.
  CPC .............. *F03D 7/0224* (2013.01); *F03D 7/024* (2013.01); *F03D 7/042* (2013.01); *Y02E 10/723* (2013.01)

(58) Field of Classification Search
  CPC ....... F03D 7/0224; F03D 7/024; F03D 7/042; F03D 7/044; F03D 7/046
  See application file for complete search history.

(56) References Cited

U.S. PATENT DOCUMENTS

| 6,726,439 | B2 | 4/2004 | Mikhail et al. |
| 7,719,128 | B2 | 5/2010 | Kammer et al. |
| 7,952,217 | B2 | 5/2011 | Nielsen et al. |
| 7,964,979 | B2 | 6/2011 | Miranda et al. |
| 8,167,555 | B2 | 5/2012 | Yoshida |
| 8,221,076 | B2 * | 7/2012 | Jeppesen ................ F03D 7/0224 290/44 |
| 8,348,609 | B2 | 1/2013 | Haraguchi |
| 8,360,723 | B2 * | 1/2013 | Veldkamp ............. F03D 7/0224 416/1 |
| 2008/0290664 | A1 | 11/2008 | Kruger |
| 2010/0078939 | A1 * | 4/2010 | Kammer ............... F03D 7/0224 290/44 |

FOREIGN PATENT DOCUMENTS

| CN | 101022260 A | 8/2007 |
| WO | 2011/124230 A2 | 10/2011 |

* cited by examiner

*Primary Examiner* — Richard Edgar
*Assistant Examiner* — Brian P Wolcott
(74) *Attorney, Agent, or Firm* — Roberts Mlotkowski Safran & Cole, P.C.; David S. Safran (57) ABSTRACT

The present invention relates to a method of controlling an idling wind turbine in which wind condition data and wind turbine position data are collected by a sensor system, a control system computes an optimal pitch angle for a rotor blade of the wind turbine, and a pitching system continuously turns the rotor blades in the same direction in multiples of 360 degrees. The present invention further relates to a wind turbine with a sensor system including a wind sensor that measures wind condition data in the vicinity of the wind turbine, and a control system including a computer that executes a control algorithm and processes sensor input from the sensor system to compute an optimal pitch angle value for a rotor blade on the hub. This allows pitching the rotor blade into angle in which the mechanical loads of that rotor blade are reduced to a minimum when idling.

12 Claims, 8 Drawing Sheets

METHOD AND SYSTEM TO ACTIVELY PITCH TO REDUCE EXTREME LOADS ON WIND TURBINE

BACKGROUND OF THE INVENTION

1. Field of the Invention

The present invention relates to a method of controlling an idling wind turbine in particular comprising a sensor system and a control system, and comprising the steps of measuring, comparing, computing and correcting the pitch angle of a wind turbine.

2. Description of Related Art

The present invention further relates to wind turbine with a sensor system comprising at least one sensor with a wind sensor configured to measure/detect wind condition data in the vicinity and preferably up-wind of the wind turbine and a control system comprising at least one computer with means for executing a control algorithm and configured to process sensor input from the sensor and to compute an optimal pitch angle value that results in a minimal mechanical load of least one rotor blade on the hub when the wind turbine is not producing power.

In wind turbine, design constraints are often fatigue loads or extreme loads.

This is true for rotor blades, the hub, the main frame, the mains shaft etc. Furthermore, the foundation is most often designed to extreme load constraints.

Focus has been on reducing the fatigue loads or to improve the fatigue properties of the materials used for the components or structures.

A person skilled in the art, who wants to build larger wind turbines or operate wind turbines, including larger wind turbines, in extreme areas or environments—including those areas with regular or frequent typhoons or hurricanes—will be inclined to reinforce the components or structures.

Such standard approaches by the person skilled in the state of the art will however not lead to a durable wind turbine in such extreme environments.

It is noted that extreme conditions do depend on the size of the rotor size. In general a larger rotor will imply the introduction of extreme conditions at lower wind speeds that for smaller rotors.

WO 2011/124230 A2 discloses a control method of a wind turbine with multiple flaps and strain gages arranged on each rotor blade for altering the aerodynamic performance of the blade. A controller located in the nacelle determines an optimal pitch angle for each rotor blade based on the measured wind speed, the yaw error and the azimuth angle for reducing the extreme loads on the blade. The flaps and strain gauges in each rotor blade are electrically connected to the controller which control an actuator connected to each of the flaps. The electrical cables extending from the rotor blade to the nacelle twist during the pitching which may cause the insulation on the electrical cables to break off resulting in a short circuiting. If the flap actuator is located in the rotor hub, the pneumatic/hydraulic hoses extending into the rotor blade also twist during pitching which may cause them to buckle or rupture resulting in a failure. This limits the pitching in one direction which means the rotor blade has to be pitched in the opposite direction when the maximum pitching angle is reached.

U.S. 2011/0076142 A1 corresponds to U.S. Pat. No. 8,360,723 B2 discloses a method of controlling a wind turbine in an idle situation in which each of the two or more rotor blades are pitched into different pitch angles. A controller continuously monitors the yawing capability and determines the pitch angle of each rotor blade based on measured vibration data and wind condition data. If grid power is not available, the rotor blades are positioned and maintained in an optimised position for various wind conditions. If grid power is available, the pitching of the rotor blades may be adjusted according to the wind direction so that the difference in pitch angle between the rotor blades is between 30 to 120 degrees. This method requires the rotor blades to be positioned in different positions so that the wind turbine experiences different loads on each rotor blades. The teachings suggest the use of strain gauges located on the rotor blade connected to the controller which requires the use of the electrical cables extending from the rotor blade to the nacelle. These electrical cables twist during the pitching which may cause the insulation on the electrical cables to break off resulting in a short circuiting.

SUMMARY OF THE INVENTION

It is an object of the present invention to provide operation schemes and technical means that will allow for operation of wind turbines in areas that are extreme or more extreme than hitherto known.

It is an object of the present invention to reduce downtime loads.

In particular, it is an object of the present invention to reduce loads from wind turbine blades.

An object of the invention is achieved by a method of controlling an idling wind turbine comprising at least a hub configured to rotate relative to a nacelle and at least one rotor blade coupled to the hub by means of at least one pitching system, wherein said method comprising at least the steps of:

collecting wind condition data from at least one wind sensor which measures wind condition data in the vicinity and preferably up-wind of the wind turbine;

collecting wind turbine position data from a sensor system;

processing said wind condition data and wind turbine position data in a control system comprising at least one computer by executing a control algorithm to compute an optimal pitch angle value for each of the rotor blade in which the forces from aerodynamic lift and drag on that rotor blade is reduced a minimum;

pitching said rotor blades by means of said pitching system to the computed optimal pitch angle value;

the rotor blades are continuously pitched in the same direction in any multiple of 360 degrees for continuously adjusting to the wind direction, and wherein the rotor blades are pitched past 360 degrees from a first pitch angle to the computed optimal pitch angle.

By idling is understood a wind turbine that is essentially stopped or at a standstill. In principle the wind turbine does not produce power, but some smaller amounts of power might be generated.

In particular the method is for extreme wind conditions, which includes high wind speeds, gusts, turbulence, but not excluding extreme temperatures or rainfalls.

It is understood that the method supersedes the yaw-control and that the nacelle is fixed in one position or left without yaw-control.

As such it is also understood that the system comprises a detector or regulator that prompts the initiation of the method i.e. includes at least one measure for when to initiate the method. In particular means for detecting and determining when an extreme weather condition is present is included.

Thereby a wind turbine can be constructed and placed in an area with extreme wind conditions, the wind turbine can be put to a standstill—i.e. not power producing—when the wind conditions are above certain criteria, and the wind turbine can be operated in a non-power producing mode, in a way that minimises the loads on the wind turbine structures. Thus saving material, even enabling design and construction and operation in such extreme areas and hence the harvesting of energy in such extreme areas.

A person skilled in the art will need a sensor system and be inspired by disclosures not only herein, but will also seek to explore alternative types of sensor systems and arrange such sensor systems to measure i.e. collect and handle the measured data in accordance with this invention and interface the measured data with subsystems.

Sensor systems to collect data or information about wind conditions such as wind speeds and or weather forecasts can be used.

Sensor systems to collect data or information about wind turbine positions such as the positions of the blades, the rotor, and the nacelle etc. can be used.

A person skilled in art will need a control system and be inspired by disclosures not only herein, but also seek inspiration from alternative control schemes readily available to provide optimal (i.e. minimal) solutions to optimisation problems with given inputs and constraints.

The control system will be configured to compare the measured wind condition data and wind turbine position data by use of an algorithm which can be implemented in multiple ways and in particular configured to find an optimal pitch angle from the data provided, which pitch angle results in a minimum of forces on the wind turbine from the aerodynamic lift and drag forces on the rotor blades.

Finally, the control system will be configured to actually pitch the rotor blades into the computed optimal pitch angle by using the pitch system.

A person skilled in the art will know that some adjusting is required between the interfaces, and in cases the person skilled in the art will appreciate the skilled advises from practitioners in wind turbine mechanics, control and optimisation.

In an embodiment, the data collection is made continuously as is the computation of the optimal solutions.

In an embodiment, the control algorithm and the optimisation procedure takes into account design parameters and values inherent in the design. These data include wind turbine static and dynamic loads and moments and in particular aerodynamic data from the blades.

A practitioner will realise that multiple optimal solutions may exist. Either due to the choice in the optimisation algorithm, differences in the quality of measured data, or simply due to the existence of multiple solutions for the same data and algorithms.

Hence, it will be natural to explore and even implement multiple optimisation strategies and algorithms to continuously try to find an even more advantageous pitch angle.

Likewise, it will be natural to implement further control strategies that will help to provide and choose amongst multiple solutions.

The person skilled in the art will try to tabulate loads on the wind turbine for ranges of wind speeds coming from between 0 and 360 degrees around the wind turbine. These loads for a combination of wind speed and wind direction will be placed in a look-up table and used to control the pitching.

The person skilled in the art will know that ultimately this grid of wind speeds and direction must be as fine as possible, but will also appreciate the use of interpolation techniques and the art of making intelligent measures of loads to allow for a coarser grid to be practically workable.

The control, where the blade can be placed in any angle allows for continuously adjusting to the wind direction. In particular when the nacelle is turning it can be required for the pitch position of the blade to track the wind in any angle and "pass" 360 degrees i.e. the method includes that the pitch angle freely can continue to turn in any direction as may be required. The control may compute an optimal pitch angle that passes 360 degrees as the rotor blade continue to turn in the same direction, or "reset" the pitch angle to 0 degrees every time that the pitch angle reaches 360 degrees, 720 degrees, 1080 degrees, etc.

During pitching of the rotor blade, a rotating electrical assembly having a rotating terminal contacting a stationary terminal, such as a slip ring, allows one or more electrical components, such as load sensors, speed sensors or other sensing means, located in the rotor blade to be continuously coupled to at least one of the computers in the control system. Alternatively, the electrical components are coupled to a wireless module or antenna located in the rotor blade which transmits and/or receives power and/or data from a wireless module or antenna in the control system. In one embodiment, the power and/or data may be inductively transferred through the slip ring via two wireless modules or antennas located in the slip ring. This prevents the electrical cables and other items extending from the rotor blade and into the rotor hub from twisting or braking, as the rotor blades is continuously pitched from a previous pitch angle into any new pitch angle in either direction. This allows the rotor blades to continue to turn, i.e. pitch, in the same direction and passes any multiples of 360 degrees, as it tracks the wind direction or resumes normal operation.

According to an embodiment of the invention, a method of controlling a wind turbine further comprises the steps of:
  collecting load data from at least one load sensor;
  processing said load data in said computer by executing said control algorithm.

Thereby the method directly minimises the load as load data are provided as a specific and direct measure to be minimised and hence more precise.

This method is further advantageous in eliminating the requirements to provide, include and interpret structural and aerodynamic data into a model or a table.

Instead this method provides directly and for the particular wind turbine information about the values that need to be minimised when the wind turbine is not producing power and in an extreme weather condition.

It is understood that a load includes tension, pressure, stress or generally a mechanical impact on the wind turbine structure either directly or inferred.

In an embodiment the load data has been tabulated during tests, quality control, validation and stored in a look-up table that provides easy and reliable values or estimates of loads on structural elements of the wind turbine.

According to an embodiment of the invention, a method of controlling a wind turbine further comprises the steps of:
  collecting load data from at least one rotor acceleration sensor;
  processing said acceleration data in said computer by executing said control algorithm.

Thereby allowing more precise inferred estimates on the loads and furthermore allowing for predicting—and thus possibly avoiding or at least reducing—positions and loads.

According to an embodiment of the invention, a method of controlling an idling wind turbine wherein at least one of said rotor blades is configured so twist and wherein that rotor blade is divided into a number of sections, such as three, wherein said method further comprises the steps of:
  collecting rotor blade twist information from at least one section;

processing said rotor blade twist information in said computer by executing said control algorithm;

computing said optimal pitch angle value for a blade twist so that at least one blade section experiences a positive angle of attack and another section experiences a negative angle of attack.

Thereby this embodiment is further advantageous by including information about changes in the aerodynamic characteristics of the blades dynamically and possibly in real time.

It is understood that collecting rotor blade twist information can be done at production or construction and the information may be included in the look-up table.

The blade can be relative stiff in which case a static measure can be used. If a more flexible blade is used, direct measurements of the twist in real time can be performed and provided in the control.

In an embodiment the aerodynamic characteristic of the blade is measured and tabulated for different angles of twists in a controlled environment before erection of the wind turbine. During operation the aerodynamic characteristic is obtained from a look-up table based on particular twists.

A person skilled in the art will appreciate that multiple twist angles will be needed to a certain number. In particular a person skilled in the art will appreciate that at least two configurations of measures to provide a positive and a negative angle of attack are particularly advantageous.

According to an embodiment of the invention, a method of controlling a wind turbine further comprises the steps of:

rotating the rotor blades back and forth between a delta rotor angle of some degrees, such as less that 10 degrees or less than 5 degrees.

Thereby continuously distributing loads over time to further reduce the overall loads on the wind turbine.

This is advantageous when the loads on the wind turbine are reduced close to a minimum as disclosed since moving slightly away from a minimum to either "side" will impose loads in different directions on the wind turbines structural elements.

According to an embodiment of the invention, a method of controlling a wind turbine further comprises the steps of:

yawing the nacelle back and forth between a delta azimuth angle of some degrees, such as less that 10 degrees or less than 5 degrees.

Thereby is provided further distribution of loads when the rotor is at a standstill or essentially in a stand still during extreme wind conditions.

According to an embodiment of the invention, a method of controlling a wind turbine further comprises the steps of:

yawing the nacelle in an azimuth angle about 90 degrees into the wind pointing the rotor blades into the wind.

Thereby is provided, in the particular embodiment, a particularly advantageous position where loads can be reduced and when the blades are twisted the method according to this invention further reduces the loads on the wind turbine.

An object of the invention is achieved by a wind turbine comprising:

a tower;

a nacelle provided at an upper end of said tower, wherein said nacelle is configured to rotate in an azimuth angle relative to said tower;

a hub with at least one rotor blade configured to rotate in a rotor angle relative to said hub, wherein said rotor blade is configured to pitch at a pitch angle in the torsional direction by means of at least one pitching system;

a sensor system comprising at least one wind sensor configured to measure wind condition data in the vicinity and preferably up-wind of the wind turbine;

a control system comprising at least one computer with means for executing a control algorithm and configured to process sensor input from the sensor system and to compute an optimal pitch angle value in which the mechanical loads of each of the rotor blades on the hub is reduced to a minimum, when the wind turbine is idling;

the pitching system is an electric pitching system configured to freely continue to turn in one direction in any multiple of 360 degrees, and wherein the pitching system is configured to continue to pitch the rotor blades past 360 degrees in the same direction for continuously adjusting to the wind direction.

Thereby a wind turbine is configured to be operated by the methods as disclosed or alternative variants of the methods having the same effects as previously disclosed.

The pitching system can pitch the blade in any angle, which allows for continuously adjusting according to the wind direction. In particular when the nacelle is turning it can be required for the pitch position of the blade to track the wind in any angle and "pass" 360 degrees i.e. the pitch angle freely can continue to turn in any direction as may be required.

An electrical pitching system is particularly advantageous since it is simple and easy to control and can be placed in any angle.

One or more electrical components, such as load sensors, speed sensors or other sensing means, may be located in the rotor blade and may be electrically coupled to at least one of the computers in the control system by means of a rotating electrical assembly having a rotating terminal contacting a stationary terminal, such as a slip ring. Alternatively, the electrical components may be coupled to a wireless module or antenna configured to transmit and/or receive power and/or data from a wireless module or antenna in the control system. In one embodiment, the wireless modules or antennas may be integrated in the slip ring for inductively transferring the power and/or data. This prevents the electrical cables and other items extending from the rotor blade and into the rotor hub from twisting or braking, as the rotor blades is continuously pitched from a previous pitch angle into any new pitch angle in either direction. This allows the rotor blades to continue to turn, i.e. pitch, in the same direction and passes any multiples of 360 degrees, as it tracks the wind direction or it resumes normal operation.

According to an embodiment of the invention, a wind turbine is furthermore characterised in having a sensor system further comprising at least one load sensor.

Thereby is allowed for dynamical or real time optimisation, i.e. minimisation, of loads on the wind turbine structure without the need of, complexity and uncertainties from inferred or calculated loads.

According to an embodiment of the invention, a wind turbine is furthermore characterised in having a sensor system that further comprises at least one rotor acceleration sensor.

Thereby is allowed for more precise estimates and even predictions of near future states or positions of the wind turbine.

According to an embodiment of the invention, a wind turbine is furthermore characterised in having said wind sensor that is a LIDAR system or an anemometer.

Thereby is provided technical means that provides timely wind condition data at least at a present time on the turbine and with the LIDAR system also around the wind turbine, thereby allowing for forecasting near future wind conditions that the wind turbine will experience.

In particular the LIDAR system will be focusing on upwind conditions and in one particular embodiment multiple LIDAR sensors are arranged to form a mesh enabling a micro weather forecast, both in temporally and spatially.

According to an embodiment of the invention, a wind turbine is furthermore characterised in having rotor blades that are configured to have a blade twist so that at least one blade section experiences a positive angle of attack and another section experiences a negative angle of attack, when the rotor is positioned in a stand still or idling a few degrees around a rotor angle.

Thereby providing a blade that is particularly well suited to extreme wind conditions where the forces on desirable blade materials and constructions inevitably will result in a twist of the blade since effects of the positive and negative angle of attack will cancel out or at least tend to cancel out.

DETAILED DESCRIPTION OF THE INVENTION

Figure 1:
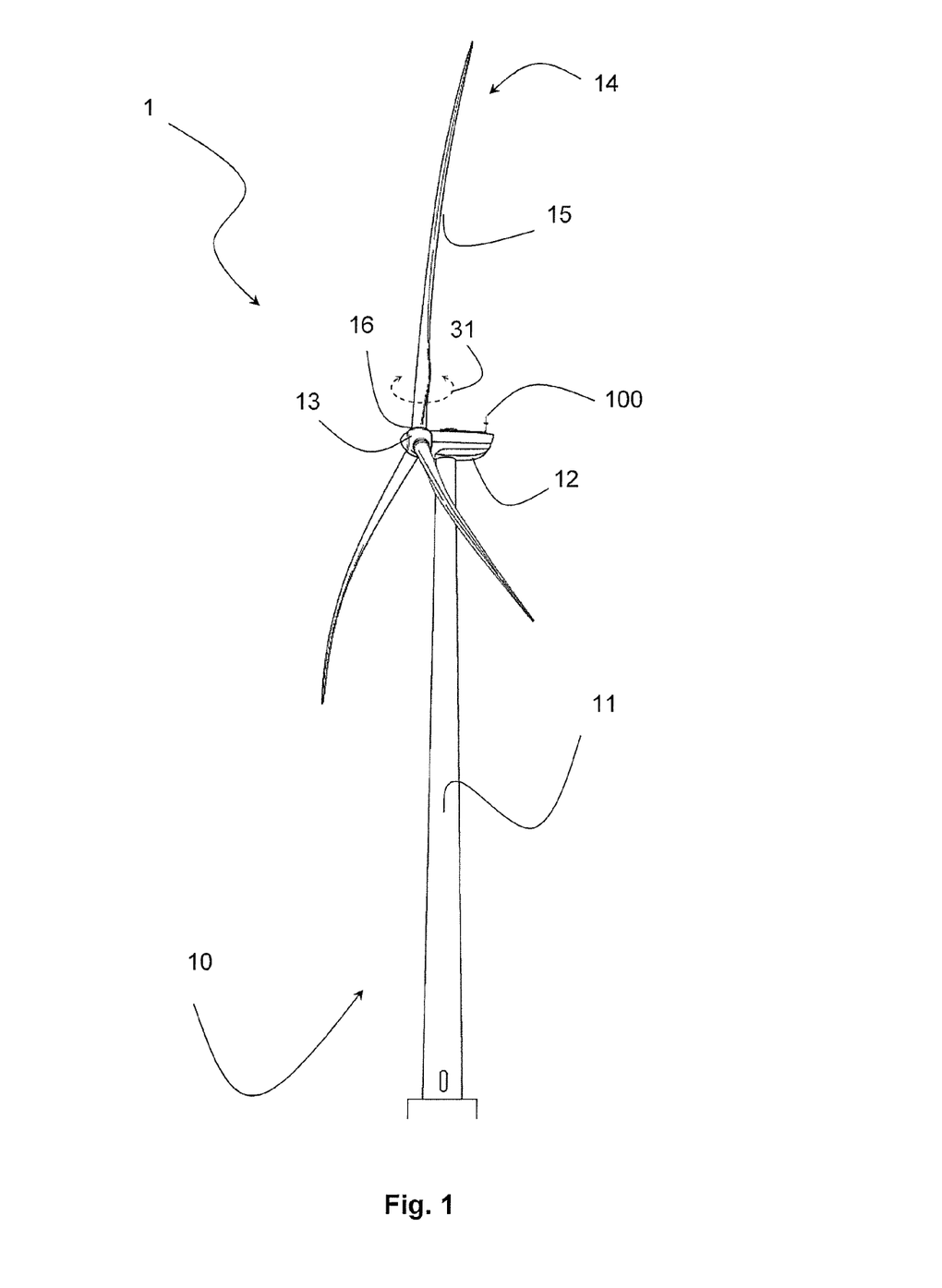
FIG. 1 shows a wind turbine comprising a tower, a nacelle, a hub and a set of rotor blades.

FIG. 1 shows a wind turbine 1 with a wind turbine system 10 comprising a tower 11, a nacelle 12, a hub 13, a rotor 14 with a set of rotor blades 15. The rotor blades 15 can be pitched by a pitching system 16.

The wind turbine system 10 further comprises a sensor system 100 part of which is indicated here and which will be further exemplified.

Figure 2:
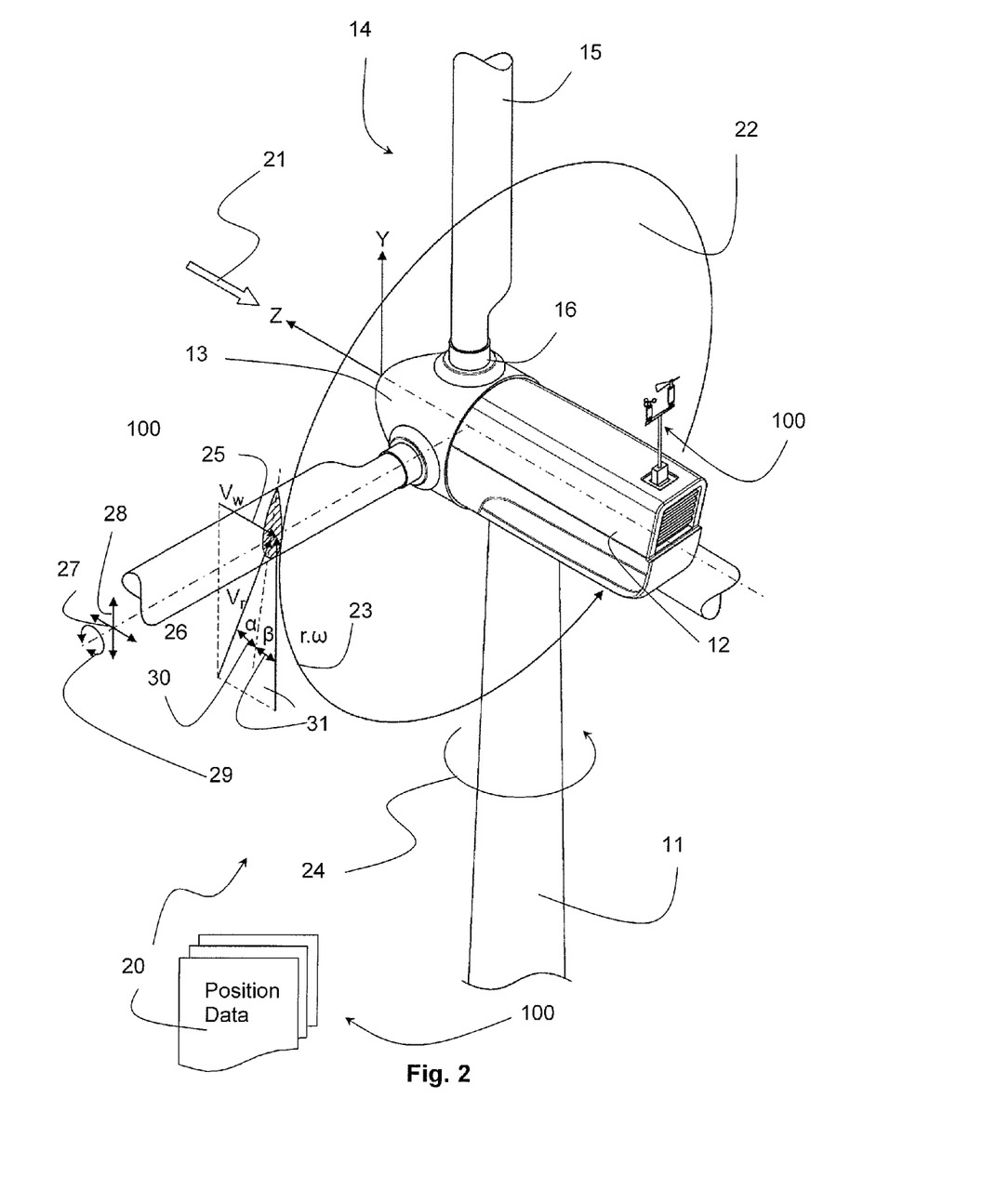
FIG. 2 shows definitions of angle positions of the rotor and associated position data.

FIG. 2 shows definitions of angles, positions and co-ordinates of the rotor 14 and associated position data 20 as will be described.

The rotor 14 on the nacelle 12 is aligned to face the wind speed direction 21 so that the rotor 14 on the nacelle 12 faces the wind in the Z-direction and perpendicular thereon, the rotor 14 rotates in a X-Y-plane of rotation 22. At any given time, the rotor 14 is positioned in a rotor angle 23. Also at any given time, the nacelle 12 is in a given azimuth angle 24 relative to the tower 11.

Each blade 15 extends radially from the hub 13 or the Z-axis 21 in the X-Y-plane 22 and each blade 15 faces velocity components from the wind $V_w$ 25 and due to the rotation of the rotor $V_r$ 26.

Each blade 15 has a flap wise direction 27 and perpendicular thereto a cord wise direction 28 that are rotateably in a torsional direction 29 (around the radial direction from the Z-axis 21).

The angle between the cord wise direction 28 and the rotational direction also given by the direction of $V_r$ 26 is the angle of attack (AoA) 30 and is variably in a pitch angle 31 due to pitching of the rotor blade 15 by the pitching system 16.

It is understood that the wind turbine system 10 is capable of retrieving data or information about the positions and relative positions of the wind turbine 1 major components and that data are available as position data 20 in a suitable format for processing.

At least part of the position data 20 are obtained by a sensor system 100.

The data can either be measured directly or inferred by relations to other data.

Figure 3:
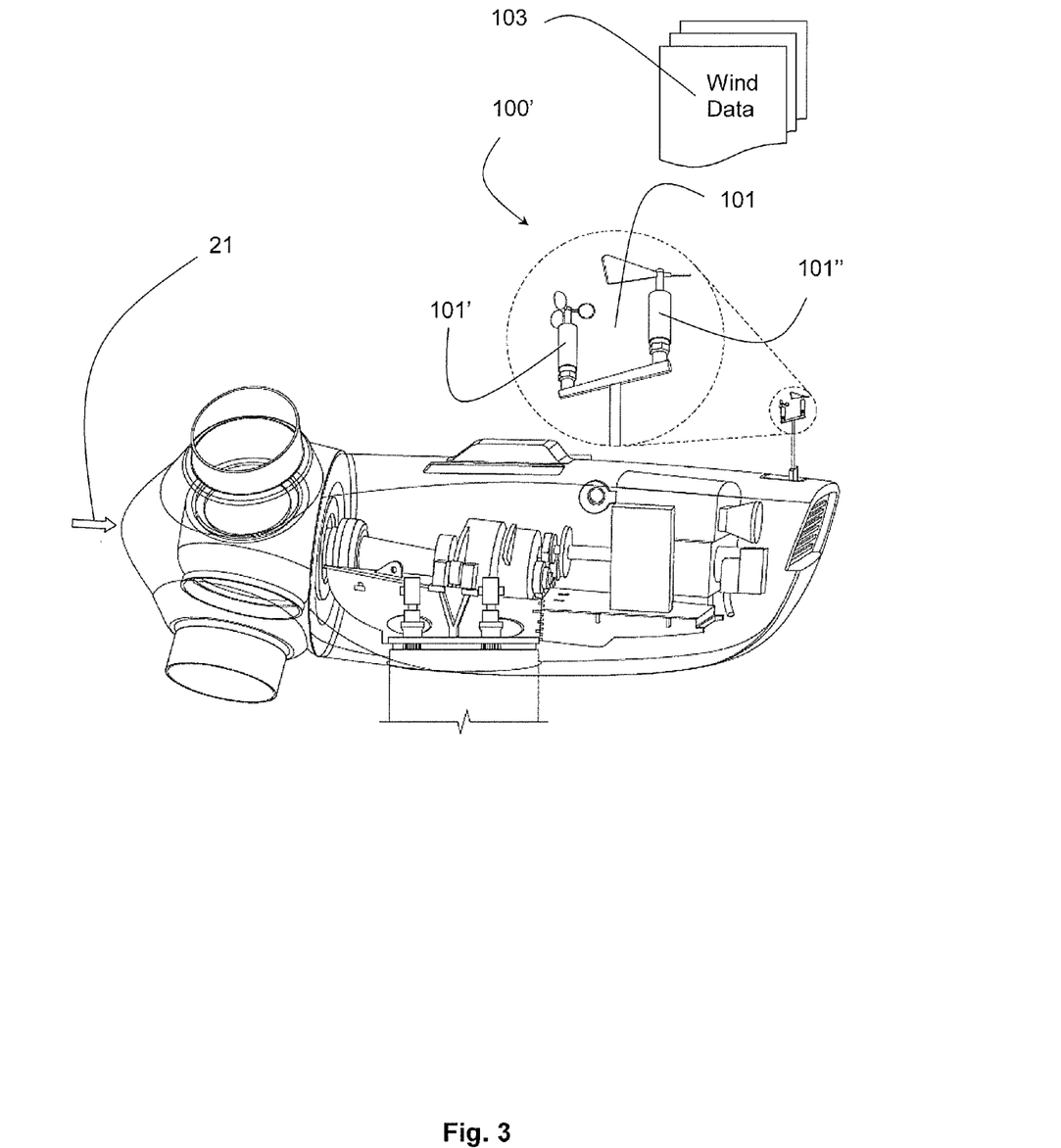
FIG. 3 shows an embodiment of a sensor system configured to collect wind data.

FIG. 3 shows an embodiment of a sensor system 100' configured to collect wind data 103. The hub 13 is facing wind from the wind speed direction 21. The wind data 103 is measured or sensed by an anemometer 101 as part of the sensor system 100'. In this embodiment, the anemometer 101 has two distinct sensors: a sensor for measuring wind speed 101' and a sensor for measuring the wind direction 101".

Although the anemometer 101 actually is downstream of the wind, for all practical purposes the measurements are at the wind turbine or in the vicinity of the wind turbine.

Figure 4:
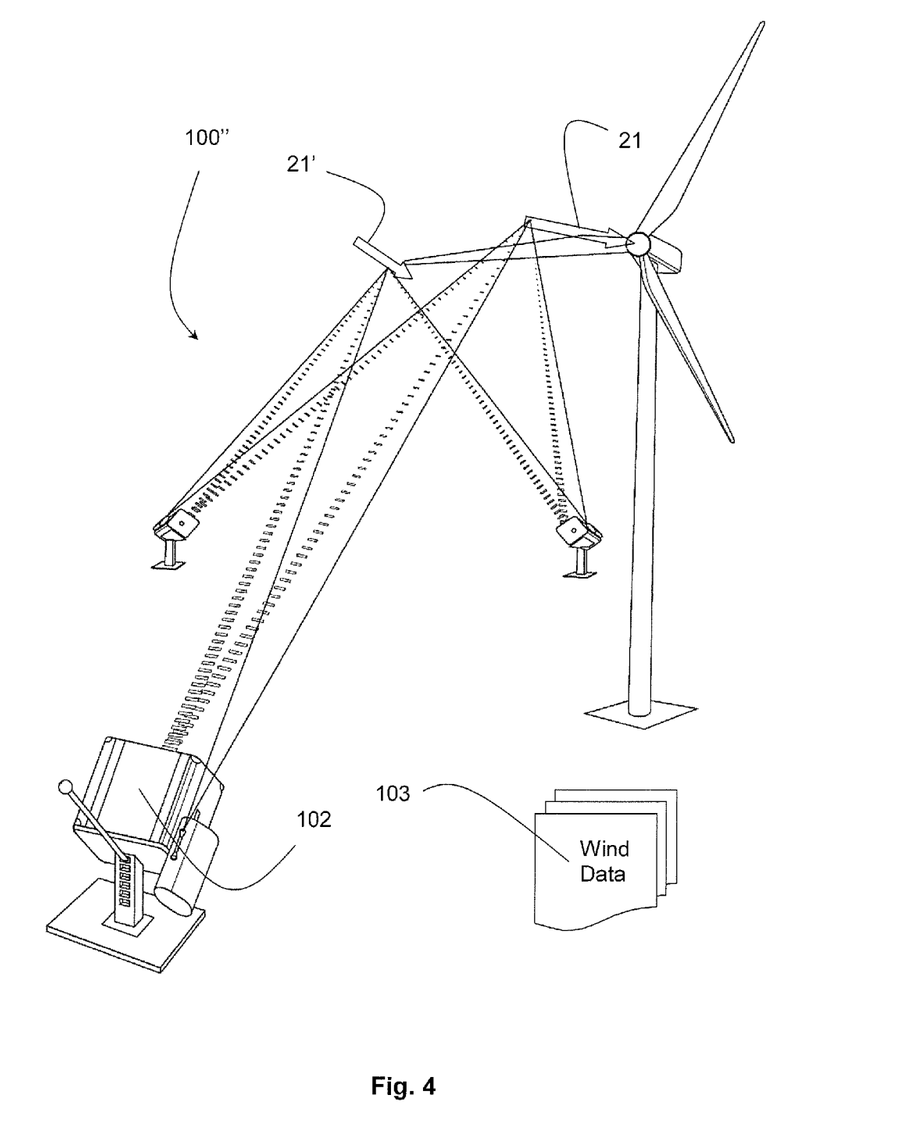
FIG. 4 shows an alternative embodiment of a sensor system comprising a land based LIDAR system to collect wind data.

FIG. 4 shows an alternative embodiment of a sensor system 100" comprising a land based LIDAR 102 system to collect wind data 103;

The LIDAR 102 system will scan the wind conditions around the wind turbine 1 and provide wind data 103 containing information about wind speed and directions 21 about to hit the wind turbine.

In general, the LIDAR 102 system collects wind data 103 containing information about wind speed, wind direction and turbulence conditions.

In this embodiment, the LIDAR 102 system comprises multiple stations located on the ground, but in alternative embodiments, the LIDAR 102 stations could be located on the wind turbine 10.

Figure 5:
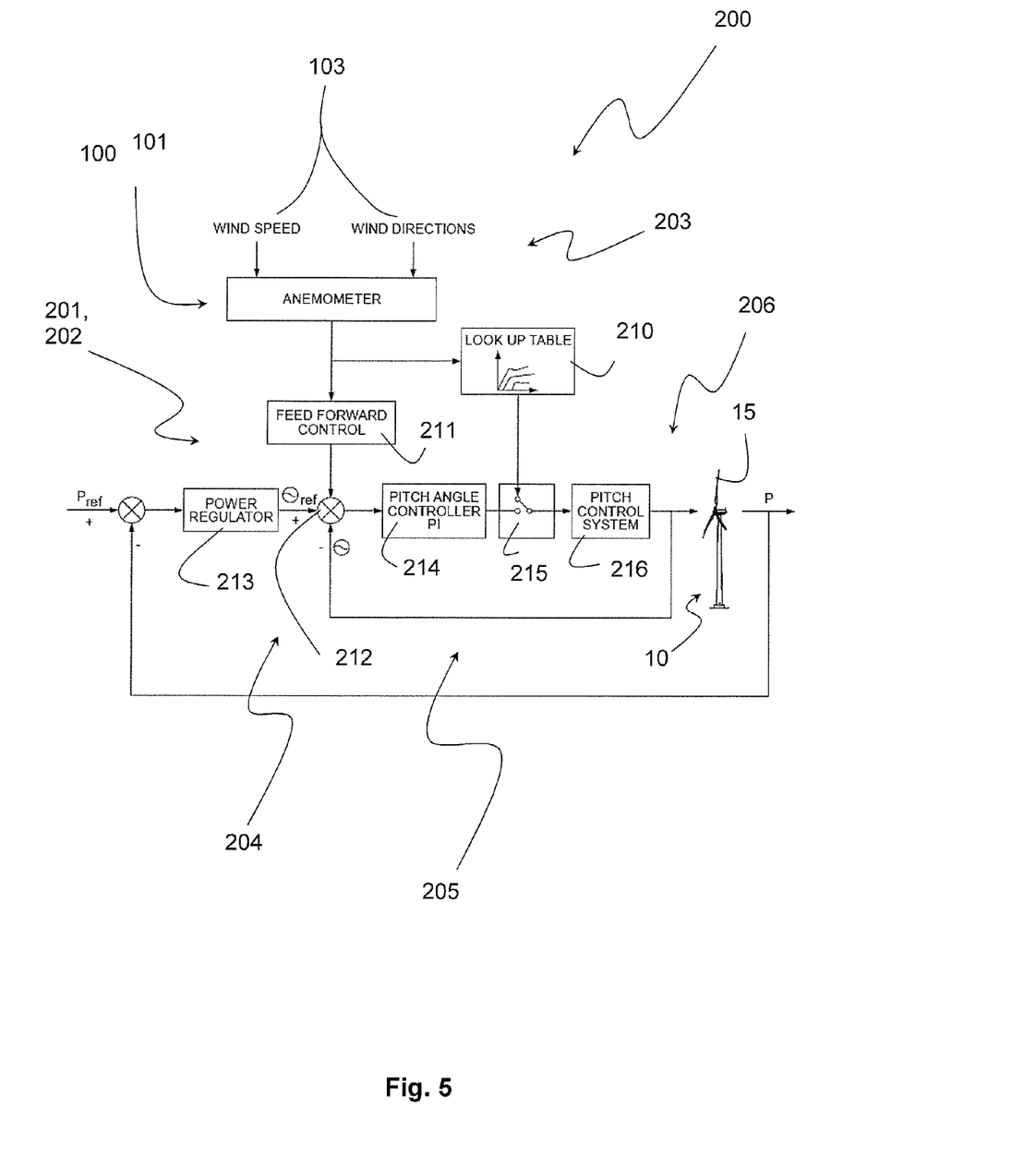
FIG. 5 shows a particular embodiment of a wind turbine control system according to the invention.

FIG. 5 shows a particular embodiment of a Proportional Integral (PI) controller of a wind turbine control system 200 according to the invention and configured to measure 203, compare 204, compute 205, and correct 206.

An anemometer 101 is chosen as the sensor system 100 providing wind condition data 103 as part of the measuring 203 section of the control system 200.

The measured wind condition data 103 is fed or compared with tabulated data in a look-up table 210 and to a feed forward control 211.

The feed forward control 211 is input to a comparator 212 that further receives an input from a power regulator 213. This essentially forms the comparing 204 section of the control system 200.

The comparator 212 gives a output that is fed to a pitch angle controller 214 which again gives an output to a pitch angle switch 215, which also receives an input from the look up table 210 that essentially determines if the computed 205 output from the pitch angle controller shall be passed through to a pitch control system 216 configured to correct 206 the pitch angle by pitching rotor blades 15 of the wind turbine system 10.

Figure 6:
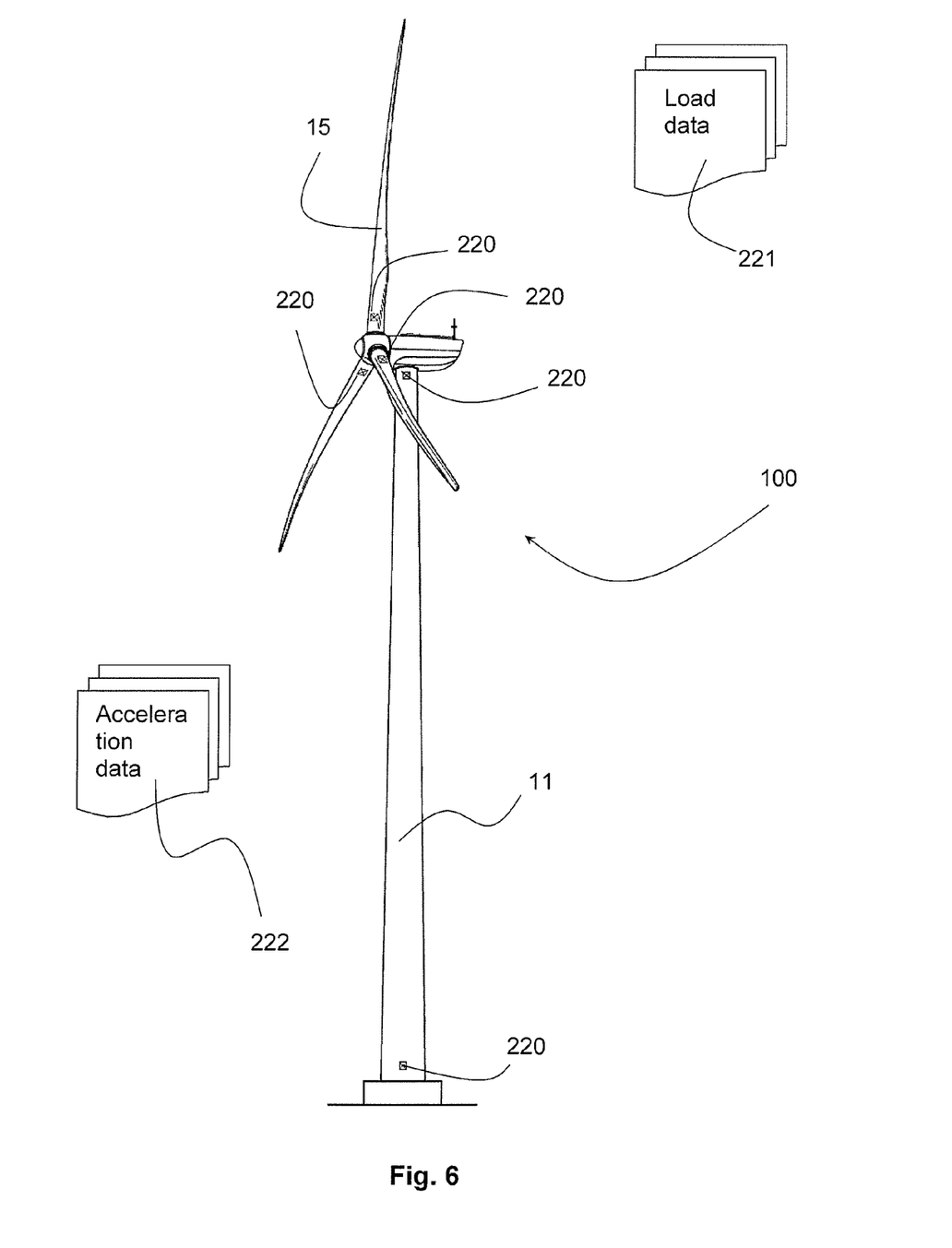
FIG. 6 shows an embodiment of a wind turbine load and sensor system.

FIG. 6 shows an embodiment of a wind turbine load and tensor sensor system comprising a set of load sensors 220 located on the wind turbine 100 and configured to provide load data 221.

In this embodiment, the most essential wind turbine loads are collected from the rotor blade 15 rod section, the top and bottom of the tower 11 as is illustrated on the figure.

Adding more measuring sections will in principle increase the precision, but also increase the complexity of the dataset with diminishing return of precision versus complexity.

Figure 7:
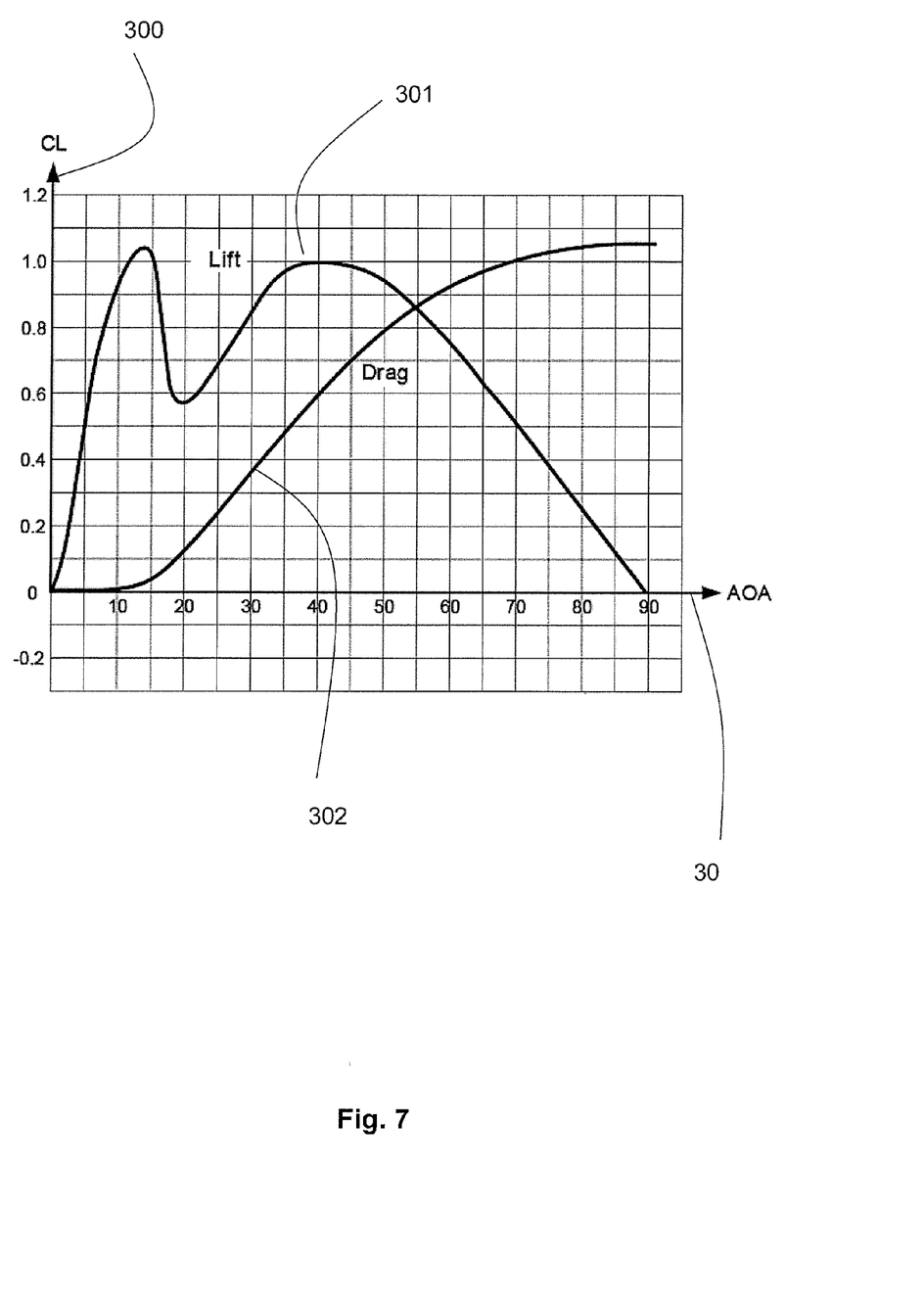
FIG. 7 shows an example of lift and drag coefficients of an airfoil.

FIG. 7 shows an example of coefficients of lift 300: a lift coefficient 301 and a drag coefficient 303 of an airfoil at a particular angle of attack (AOA) 30.

The graph show typical lift 301 and drag 302 coefficients of a symmetrical airfoil, and hence the lift curve shows zero lift at an AOA 30 of zero degrees.

In this particular embodiment, the lift 301 peaks at about an AOA of 15 degrees where the drag 302 still is relatively low and thus resulting in a maximum lift of the blade.

It is seen that an AOA of close to 90 degrees is required to achieve maximum drag 302.

Hence, for an airfoil as this, the pitch angle 31 should be set so that a large part of the rotor blade 15 experiences an AOA close to zero degree.

In an embodiment of the invention, the lift 301 and the drag 302 coefficients for the particular rotor blade 15 are tabulated and available in the control system 200 and assessable to the control algorithm 202 and may form a part of the look-up table 210.

Figure 8:
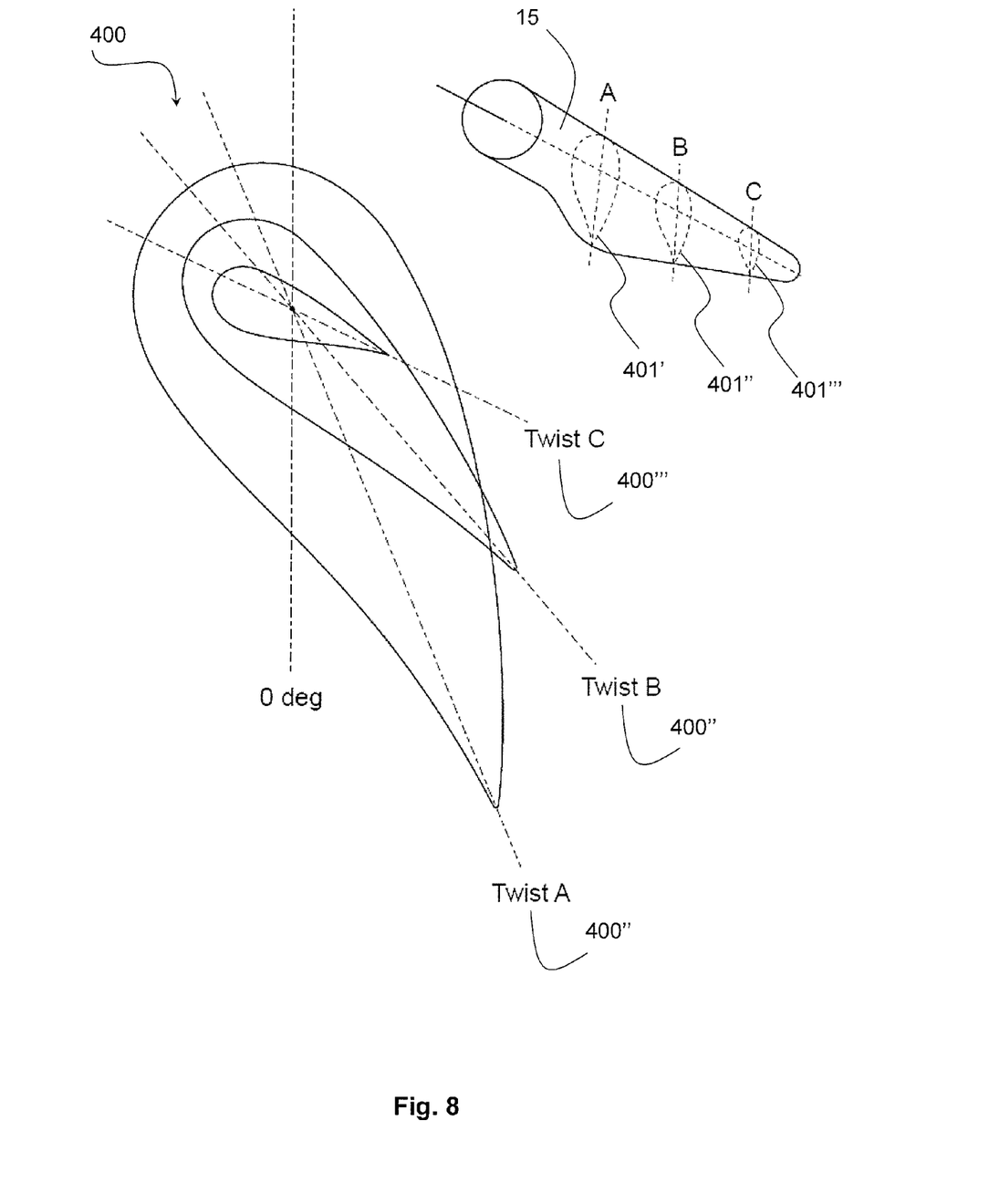
FIG. 8 shows an embodiment of a wind turbine blade that is twisted in the radial direction.

FIG. 8 shows an embodiment of a rotor blade 15 that has a blade twist 400 that changes in the radial direction of the rotor blade 15.

The rotor blade 15 is divided into sections, here A, B, and C, in the radial direction and for each section 401', 401'', 401''' there is a blade twist 400', 400'', 400'''.

It has been found that since the blades 15 usually twist about 15 degrees, it is not possible to pitch the blade so that the blade experiences an AOA of zero-degree over the entire radial direction.

One configuration that minimises or closely minimises is when the outer part of the blade 15, say at section C 401''', is configured to experience a negative AOA 31 and the inner part of the blade, say section A 401', experiences a positive AOA 31.

Another configuration that achieves this is when the outer section 401''' experiences a positive AOA 31 and the inner section 401 experiences a negative AOA 31.

In both mentioned sections, it is advantageous that a middle section B 401' over a range experiences an AOA 31 that is close to zero degree and more or less flat.

What is claimed is:

1. A method of controlling an idling wind turbine comprising at least a hub configured to rotate relative to a nacelle and at least one rotor blade coupled to the hub by means of at least one pitching system, said method comprising at least the steps of:
   collecting wind condition data from at least one wind sensor which measures the wind condition data in the vicinity and preferably up-wind of the wind turbine;
   collecting wind turbine position data from a sensor system;
   processing said wind condition data and wind turbine position data in a control system comprising at least one computer by executing a control algorithm to compute an optimal pitch angle value for each of the rotor blade in which the forces from aerodynamic lift and drag on that rotor blade are reduced to a minimum; and
   pitching said rotor blades by means of said pitch system to the computed optimal pitch angle value,
   wherein the rotor blades are continuously pitched in a same direction in any multiple of 360 degrees for continuously adjusting to the wind direction, and
   wherein the rotor blades are pitched past 360 degrees from a first pitch angle to the computed optimal pitch angle.

2. The method according to claim 1, wherein said method further comprises the steps of:
   collecting load data from at least one load sensor;
   processing said load data in said computer by executing said control algorithm.

3. The method according to claim 1, wherein said method further comprises the steps of:
   collecting load data from at least one rotor acceleration sensor;
   processing said acceleration data in said computer by executing said control algorithm.

4. The method according to claim 1, wherein at least one of said rotor blades is configured to twist and wherein that rotor blade is divided into a number of sections, and wherein said method further comprises the steps of:
   collecting blade twist information from at least one section;
   processing said blade twist information in said computer by executing said control algorithm;
   computing said optimal pitch angle value for a blade twist so that at least one blade section experiences a positive angle of attack and another section experiences a negative angle of attack.

5. The method according to claim 1, wherein the method further comprises the step of:
   rotating the rotor blades back and forth between a delta rotor angle of some degrees, such as less that 10 degrees or less than 5 degrees.

6. The method according to claim 1, wherein the method further comprises the step of:
   yawing the nacelle back and forth between a delta azimuth angle of some degrees, such as less that 10 degrees or less than 5 degrees.

7. The method according to claim 1, wherein the method further comprises the step of:
   yawing the nacelle in an azimuth angle about 90 degrees into the wind pointing the rotor blades into the wind.

8. A wind turbine configured to be controlled in an idle mode according to claim 1, wherein the wind turbine comprises:
   a tower;
   a nacelle provided at an upper end of said tower, wherein said nacelle is configured to rotate in an azimuth angle relative to said tower;
   a hub with at least one rotor blade configured to rotate in a rotor angle relative to said hub, wherein said rotor blade is configured to pitch at a pitch angle in a torsional direction by means of at least one pitching system;
   a sensor system comprising at least one wind sensor configured to measure wind condition data in a vicinity and preferably up-wind of the wind turbine; and
   a control system comprising at least one computer for executing a control algorithm and configured to process sensor input from the sensor system and to compute an optimal pitch angle value in which mechanical loads of each of the rotor blades on the hub is reduced to a minimum, when the wind turbine is idling,
   wherein the pitching system is an electric pitching system configured to freely continue to turn in one direction in any multiple of 360 degrees, and
   wherein the pitching system is configured to continue to pitch the rotor blades past 360 degrees in the same direction for continuously adjusting to the wind direction.

9. The wind turbine according to claim 8, wherein said sensor system further comprises at least one load sensor.

10. The wind turbine according to claim 8, wherein said sensor system further comprises at least one rotor acceleration sensor.

11. The wind turbine according to claim 8, wherein said wind sensor is a LIDAR system or an anemometer.

12. The wind turbine according to claim 8, wherein said rotor blades are configured to have a blade twist so that at least one blade section experiences a positive angle of attack and another section experiences a negative angle of attack, when the rotor is positioned in a standstill or idling a few degrees around a rotor angle.

\* \* \* \* \*